(12) United States Patent
Ai

(10) Patent No.: US 7,153,230 B2
(45) Date of Patent: Dec. 26, 2006

(54) ECCENTRIC PLANETARY TRACTION DRIVE TRANSMISSION WITH FLEXIBLE ROLLER FOR ADAPTIVE SELF-LOADING MECHANISM

(75) Inventor: Xiaolan Ai, Massillon, OH (US)

(73) Assignee: The Timken Company, Canton, OH (US)

( * ) Notice: Subject to any disclaimer, the term of this patent is extended or adjusted under 35 U.S.C. 154(b) by 572 days.

(21) Appl. No.: 10/298,762

(22) Filed: Nov. 18, 2002

(65) Prior Publication Data

US 2004/0048712 A1 Mar. 11, 2004

Related U.S. Application Data

(60) Provisional application No. 60/354,010, filed on Jan. 31, 2002, provisional application No. 60/374,746, filed on Apr. 23, 2002.

(51) Int. Cl.
*F16H 1/32* (2006.01)

(52) U.S. Cl. .................. 475/166; 475/168; 475/195

(58) Field of Classification Search ............... 475/165, 475/166, 168, 179, 195; 476/61
See application file for complete search history.

(56) References Cited

U.S. PATENT DOCUMENTS

| | | | | |
|---|---|---|---|---|
| 1,093,922 A | * | 4/1914 | Dieterich | 476/15 |
| 1,291,654 A | | 1/1919 | Morison | |
| 3,060,767 A | * | 10/1962 | Parrett | 475/183 |
| 3,380,312 A | * | 4/1968 | Barske | 476/61 |
| 3,776,051 A | * | 12/1973 | Kraus | 476/8 |
| 3,848,476 A | * | 11/1974 | Kraus | 476/70 |
| 3,945,270 A | | 3/1976 | Nelson et al. | |
| 4,481,842 A | | 11/1984 | Nelson | |
| 4,483,216 A | * | 11/1984 | Takahashi et al. | 475/195 |
| 4,555,963 A | | 12/1985 | Nelson | |
| 4,709,589 A | | 12/1987 | Kraus | |
| 5,931,759 A | | 8/1999 | Otaki et al. | |
| 2004/0067811 A1 | | 4/2004 | Ai | |

FOREIGN PATENT DOCUMENTS

| | | | | |
|---|---|---|---|---|
| DE | 2458762 | | 6/1976 | |
| EP | 0856462 | | 8/1998 | |
| JP | 2-180347 | * | 7/1990 | 475/165 |
| JP | 6-241285 | * | 8/1994 | 475/165 |
| JP | 10331933 | | 12/1998 | |

\* cited by examiner

*Primary Examiner*—Ha Ho
(74) *Attorney, Agent, or Firm*—Polster, Lieder, Woodruff & Lucchesi, L.C.

(57) ABSTRACT

An eccentric planetary traction drive transmission which includes at least two planetary rollers, sun roller member, and a carrier member. One of the planetary rollers is flexible and is positioned between and in contact with an outer ring member and the sun roller member. Rotation of either the outer ring member or the sun roller member wedges the flexible planetary roller within a convergent wedge gap which squeezes the flexible planetary roller between the outer ring member and the sun roll member. Friction between the flexible planetary roller, the sun roller member, and the outer ring member transmits rotational motion and torque between the outer ring member and the sun roller member. The other at least one supporting planetary roller is a supporting roller which supports the sun roller member and the carrier member. A plurality of bearings supports the sun roller member within the outer ring member and the at least one supporting planetary roller.

23 Claims, 6 Drawing Sheets

ECCENTRIC PLANETARY TRACTION DRIVE TRANSMISSION WITH FLEXIBLE ROLLER FOR ADAPTIVE SELF-LOADING MECHANISM

CROSS-REFERENCE TO RELATED APPLICATIONS

This application is related to U.S. Provisional Patent Application 60/354,010 filed Jan. 31, 2002, and U.S. Provisional Patent Application No. 60/734,746 filed Apr. 23, 2002, from which priority to both applications is claimed.

STATEMENT REGARDING FEDERALLY SPONSORED RESEARCH OR DEVELOPMENT

Not applicable.

BACKGROUND OF THE INVENTION

1. Field of the Invention

This invention relates in general to a planetary traction drive transmission, and, more particularly, to a planetary traction drive transmission with at least one flexible roller having an adaptive self-loading mechanism.

2. Description of Related Art

Traction drives use frictional force to transmit torque and power. Because the power is transmitted between two smooth surfaces, often through a thin layer of lubricant, a traction drive possesses unique characteristics that are not readily attainable by gear drives. These characteristics include quietness, high-efficiency, high rotational accuracy, and zero-backlash.

Generating adequate normal force at the contact is essential for traction drives. Various loading mechanisms have been proposed. These mechanisms have lead to a host of designs. A common practice is to use tapered surfaces along the axial direction. By moving these surfaces axially, a radial displacement and thus normal force are generated. Examples of such designs are disclosed in U.S Pat. Nos. 3,475,993 and 3,375,739.

Since the envelopes of the tapered surfaces in most designs do not necessarily converge to a common point, this results in a so-called spin motion at contacting surfaces. The spin motion not only offsets the high-efficiency otherwise provided by the traction drive, but also causes component wear and high break away torque.

Recently, a design of zero-spin planetary traction drive has been proposed by Ai as disclosed in the U.S. Pat. No. 6,095,940. This design employs the on-apex concept similar to that of tapered roller bearings. Two rows of planetary rollers are used to balance the internal axial force on the planetary rollers. Although this design offers torque actuated loading mechanism and greater torque capability, it is somewhat complex in construction.

The cylindrical planetary traction drive is also able to achieve zero-spin motion. However, generating sufficient normal force at the contacts has been a challenge. Designs proposed in the past have offered various means to pre-load the drive either by mechanically deforming the outer rings or by thermal assembling the drive. The pre-load generated by such means, in general, can not be adjusted during operation. For partial load application, traction drives are unnecessarily overloaded. This has negative impacts on transmission efficiency and service life.

Perhaps the simplest means to generate torque responsive load is using eccentric planetary drives as was disclosed by Dieterich U.S. Pat. No. 1,093,922 in 1914. Over the years, various improvements have been proposed. See for example, U.S. Pat. Nos. 3,945,270, 4,481,842, 4,555,963, and foreign patent numbers JP10-311398, EP 0,856,462 A2. They all have multiple planetary rigid rollers, and each planetary roller requires a supporting shaft.

While friction actuated loading mechanisms have been disclosed in prior art where one of the planetary rollers was entrained by friction force into the wedged-space created by eccentric raceways, the loading roller was rigid and thus the entrainment angle was kept constant. This was based on the notion that the maximum traction coefficient was constant during the operation. The entrainment angle was determined based on a specified friction coefficient, which was assumed to be not a function of the contact load. Such a loading mechanism was either over conservative or inadequate when the maximum available traction coefficient changes with contact load.

For eccentric planetary drives, the planetary rollers have different sizes. In most of the prior art designs, this has led to different contact stresses at the contact between the sun roller and planets.

In some designs proposed in prior art, the drive had more than one loading roller that is moveable. This could cause a change in eccentricity between input and out put shafts as the loading roller adjust their positions.

Therefore, it is desirable to provide a simple and improved design that allows for an adaptive, torque responsive loading mechanism where the entrainment angle changes as load varies to match the variation in the maximum available traction coefficient, a design that offers balanced contact stresses for all planet rollers and that reduces or eliminates the change in eccentricity as loading roller adjusting its position.

SUMMARY OF THE INVENTION

This patent application relates to planetary traction drives in general and specifically to an eccentric, cylindrical planetary traction drive having at least one flexible planetary roller capable of providing adaptive self-loading mechanism to facilitate the transfer of rotational motion and torque. The current invention also provides a traction drive that allows for an adaptive torque responsive loading and also provides a traction drive with well-balanced contact stresses at the most critical contacts.

DESCRIPTION OF THE DRAWINGS

Corresponding reference characters indicate corresponding parts throughout the several views of the drawings.

DETAILED DESCRIPTION OF THE INVENTION

Figure 1:
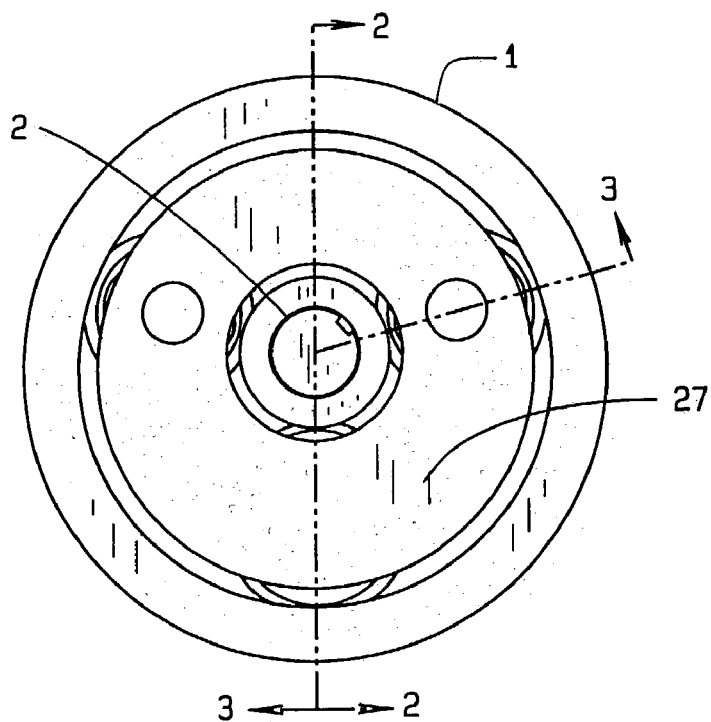
FIG. 1 is a front view of the present invention.
Figure 2:
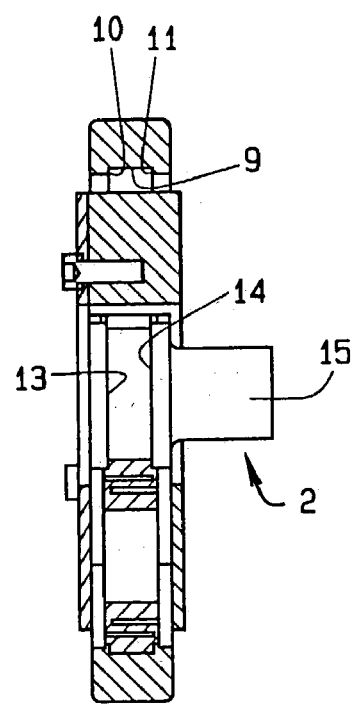
FIG. 2 is a left side sectional view of the present invention.
Figure 3:
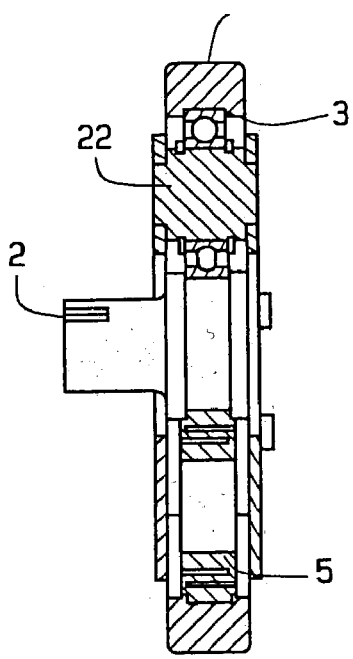
FIG. 3 is an oblique sectional view of the present invention.
Figure 4:
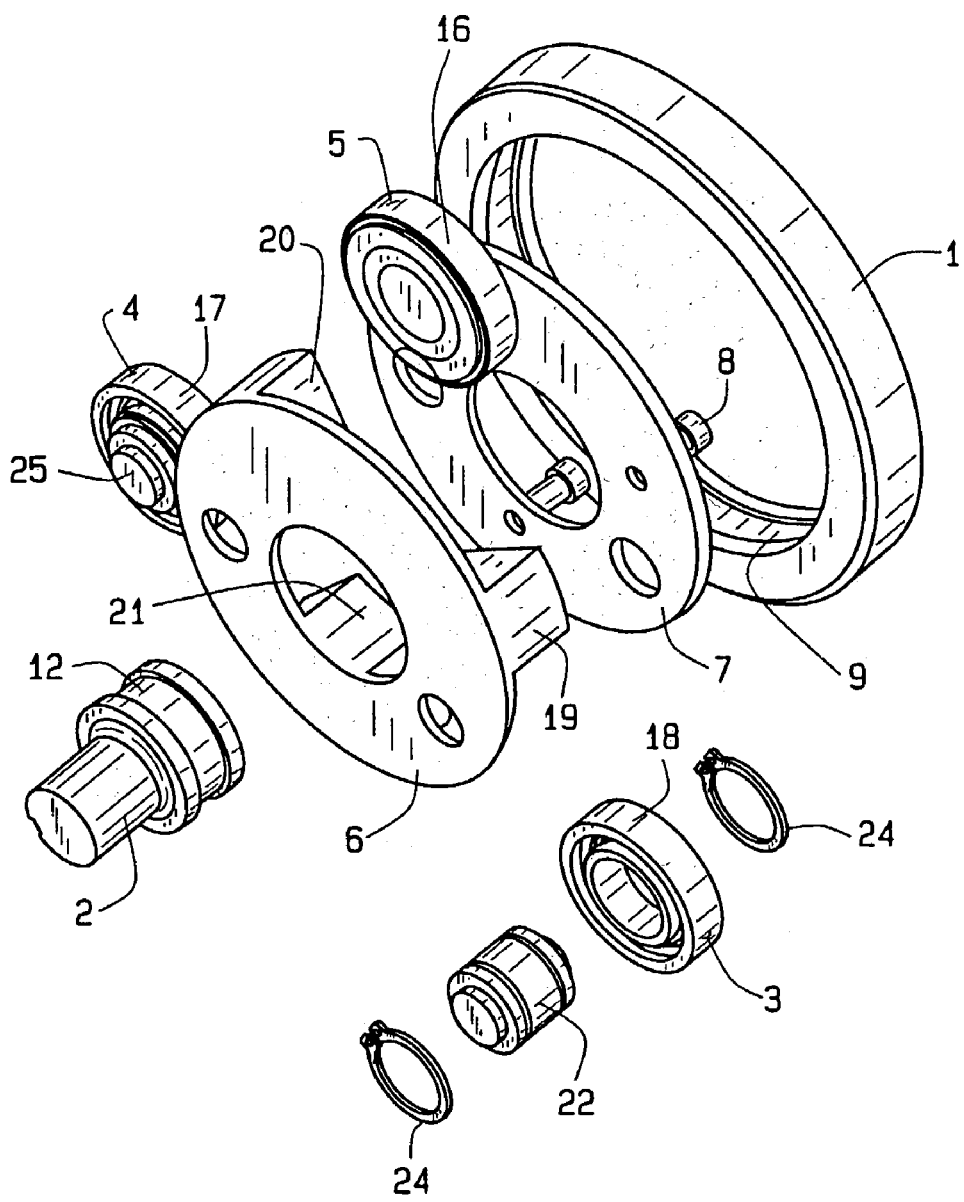
FIG. 4 is an exploded view of the present invention.

Referring now to FIGS. 1 and 2, one embodiment of the cylindrical planetary traction drive A comprises an outer ring member 1, a sun roller member 2, a first planetary roller 5, two second planetary rollers 3 & 4, and a carrier member 27. The outer ring member 1 further comprises a first cylindrical raceway 9 surrounding the axis of rotation, and a first fixed flange 10 and a second fixed flange 11.

The sun member 2 includes a second cylindrical raceway 12, a third fixed flange 13, a fourth fixed flange 14, and a shaft 15. The first planetary roller 5 has a third cylindrical raceway 16, and the second planetary rollers 3 and 4 have a fourth cylindrical raceway 18 and 17 respectively. The first planetary roller 5 and the two second planetary rollers 3 and 4 are placed between and in contact with first cylindrical raceway 9 and second cylindrical raceway 12.

At least one of either the planetary roller 5 or the planetary rollers 3 and 4 is flexible compared to other rollers. In the embodiment shown herein, the first planetary roller 5 is the flexible roller and serves as a loading roller. Thus, it will hereafter be called the loading planetary roller 5. The loading planetary roller 5 deforms noticeably when diametrically squeezed.

At least one of the second planetary rollers 3 and 4 is a supporting roller. The supporting roller is relatively rigid and hardly deforms under diametrical load. In the embodiment shown herein, both planetary rollers 3 and 4 are supporting rollers and will hereafter be called the supporting planetary rollers 3 and 4. The supporting planetary rollers 3 and 4 are firmly fixed by shafts 22 and 25 respectively to the carrier member 27. Each of the supporting planetary rollers 3 and 4 is mounted onto its respective shaft 22 or 25 with a bearing 26 and two snap rings 24.

Figure 5:
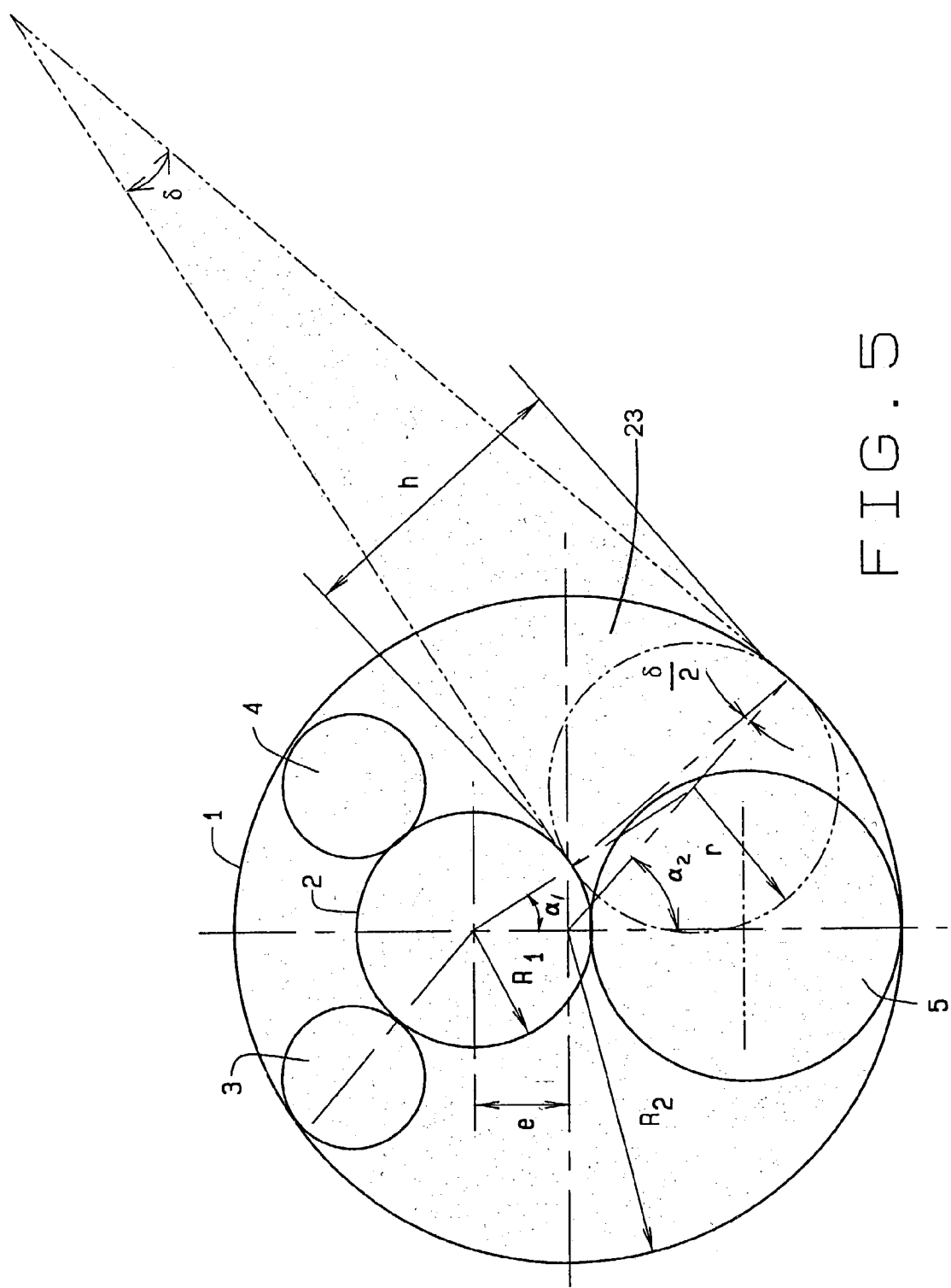
FIG. 5 is a graphical representation of the mathematical relationship between various components of the present invention.

The carrier member 27 contains a base plate 6 and a cover plate 7. There are extrusions 19, 20, and 21 protruding perpendicular from the back face of the base plate 6. The cover plate 7 is fastened to the top of the extrusions using fasteners 8, forming cavities for receiving the loading planetary roller 5 and the supporting planetary rollers 3 and 4. The first cylindrical raceway 9 on the outer ring member 1 is eccentric to the second cylindrical raceway 12 on the sun member 2. The space between the first cylindrical raceway 9 and the second cylindrical raceway 12 forms a wedge gap 23 (FIG. 5).

The width of the wedged-gap h is expressed as:

$$h = 2r\cos\frac{\delta}{2} \quad (1a)$$

It can be approximated by the following cosine function:

$$h \approx R_2 - R_1 + e\cos\alpha_1 \quad (1b)$$

where $R_1$ is the radius of the sun roller raceway 12; $R_2$ is the radius of the first cylindrical raceway 9; and e represents the eccentricity between the raceways 12 & 9 of the sun roller member and the outer ring.

The wedge angle $\delta$ for planetary roller at azimuth position $\alpha_1$ is given by:

$$\delta = \text{Arccos}\left[\frac{(R_1+r)^2 + (R_2-r)^2 - e^2}{2(R_1+r)(R_2-r)}\right] \quad (2)$$

where r is the effective radius of the planetary roller at this azimuth position, and can be expressed in terms of $\alpha_1$ as:

$$r = \frac{R_2^2 - R_1^2 - e^2 + 2eR_1\cos\alpha_1}{2(R_2 + R_1 - e\cos\alpha_1)} \quad (3a)$$

The wedge angle $\delta$ represents a contact geometry condition.

The geometry coefficient $\mu_G$ is defined as:

$$\mu_G = \tan\left(\frac{\delta}{2}\right) \quad (4)$$

As can be seen from equations (1) to (4), for $\alpha_1$ between 0 and 90 (or 0 and −90), when $\alpha_1$ moves away from $\alpha_1=0$ position, the width of the gap h reduces, the wedge angle increases and thus geometry coefficient $\mu_G$ increases.

In the embodiment shown in FIG. 1, the flexible loading planetary roller 5 is assembled in the wedge gap 23 at an azimuth angle between $\alpha_1=-90$ to 90 degrees, preferably in vicinity of $\alpha_1=0$. The center of the flexible loading planetary roller 5 is left floating along the wedge gap 23. The flexible loading planetary roller 5 is sufficiently flexible in the radial direction. When squeezed its effective diameter reduces in the corresponding direction. It is recommended that at home position, $\alpha_1=0$, the flexible loading planetary roller 5 is slightly squeezed.

The supporting planetary rollers 3 and 4 are arranged in wedge gap 23 generally between azimuth positions of $\alpha_1=90$ to 270 degrees. The centers of each of the supporting planetary rollers 3 and 4 are fixed to the carrier member 27.

The planetary traction drive A is preferred to operate with the carrier member 27 stationary. During operation, the traction force tangent to the third cylindrical raceway 16 of the loading planetary roller 5 always drags the loading planetary roller 5 into the convergent wedge gap 23. The loading planetary roller 5 is thus squeezed, generating substantial contacting force normal to the contact surfaces. If the eccentricity e in relationship to geometry of the planetary train is favorable, a balance is achieved where the maximum available traction force is equal to or greater than the operating traction force. This condition is called frictional self-loading. The relationship for ensuring such fictional self-loading is set forth by:

$$\mu_G \leq \mu_T \quad (5a)$$

where $\mu_T$ is the maximum available friction coefficient at the contacts.

For optimal efficiency and service life of the planetary traction drive A, it is always desirable to have geometry coefficient $\mu_G$ close to but slightly smaller than the maximum available traction coefficient $\mu_T$ under various load conditions. That is:

$$\mu_G \leq \approx \mu_T \quad (5b)$$

During operation, the loading planetary roller 5 is entrained into the convergent wedge gap 23 and squeezed.

Consequently, the effective diameter (or radius) of the loading planetary roller 5 reduces. The loading planetary roller 5 thus moves to a new azimuth position, establishing a new balance. At the new position, the width of wedge gap 23 is narrower and the contact geometry coefficient $\mu_G$ is increased.

The diametrical reduction of the loading planetary roller 5 can be estimated by:

$$2dr = \left(\frac{\pi}{4} - \frac{2}{\pi}\right)\frac{Wr^3}{EI} \tag{6}$$

where W is the contact load; E is the Young's elastic modulus; and I is the area moment of inertia of ring cross section for the flexible first planetary roller 5.

The geometry coefficient $\mu_G$ corresponding to this diametrical reduction is:

$$\mu_G = \tan\left\{\frac{1}{2}\text{Arccos}\left[\frac{(R_1+R_2+e-2dr)^2 + (R_1+R_2-e+2dr)^2 - 4e^2}{2(R_1+R_2+e-2dr)(R_1+R_2-e+2dr)}\right]\right\} \tag{7a}$$

Figure 7:
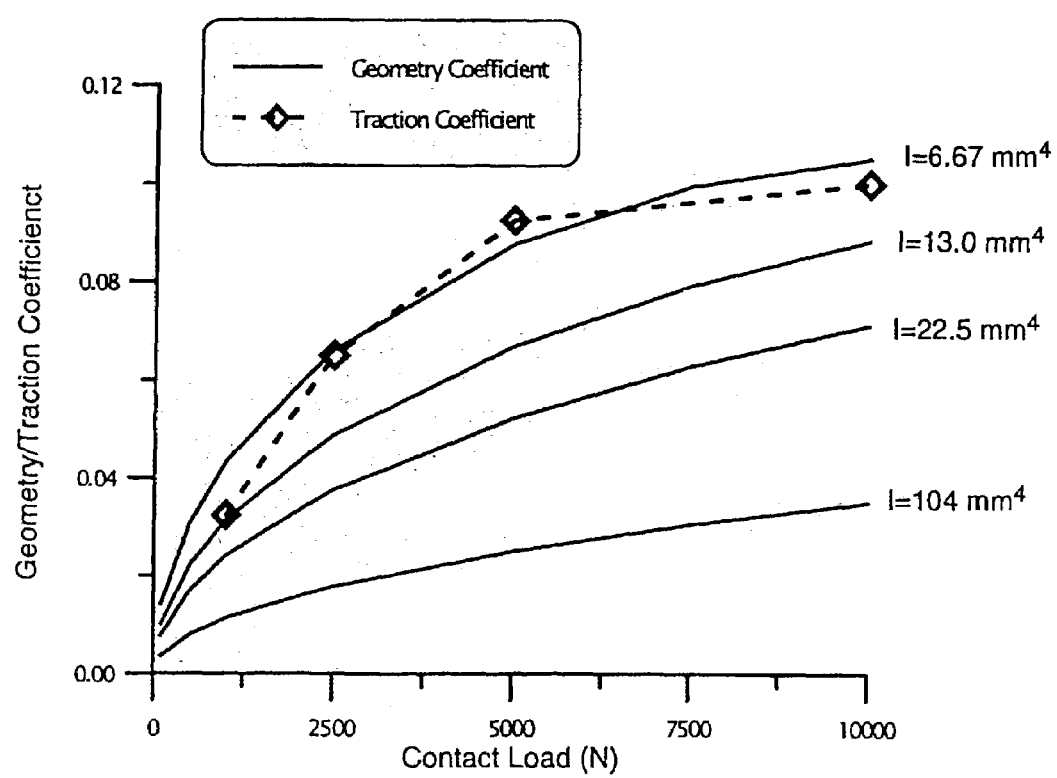
FIG. 7 is a graph showing the relationship between the contact load and the geometry/traction coefficient of the present invention.

With equations (6) and (7a), the increase in geometry coefficient $\mu_G$ with the contact load can be quantified. FIG. 7 shows the variation of $\mu_G$, with contact load W for planetary rollers with different cross section moment of inertia I.

The maximum geometry coefficient is bounded by $$\mu_{G\,max} = \tan\left\{\frac{1}{2}\text{Arccos}\left[1 - 2\left(\frac{e}{R_1+R_2}\right)^2\right]\right\} \tag{7b}$$

On the other hand, a large body of research results (Tevaarwerk, NASA CR-165226, 1981) showed that the maximum available traction coefficient $\mu_T$ increases with contact pressure or contact load. The change in $\mu_T$ with contact load for a traction fluid is also plotted in FIG. 7 with symbols and a dotted line.

The flexible, floating planetary roller design of the current invention thus provides an opportunity for an adaptive frictional self-loading mechanism. That is, to adaptively change contact geometry coefficient to match the change in maximum available traction coefficient. As a result, not only constrain (5a) can be met, but also the geometry coefficient can be kept close to the maximum available traction coefficient (constraint (5b)) for the entire load spectrum. Adaptive self-loading can be achieved by choosing a flexible planetary roller with adequate cross section moment of inertia I. With this flexible roller it is possible to the change contact geometry coefficient and have the change match or compensate for the change in the maximum available traction coefficient when contact load changes. For example, the second curve in FIG. 7 with I=13 mm$^4$ matches the change in maximum traction coefficient. This curve demonstrates the adaptive design principle.

The flexible loading planetary roller 5 can be as simple as a ring, however, other design alternatives are also possible.

The torque capacity of a traction drive is determined by the maximum allowable stress at the contact. Since planetary rollers for an eccentric planetary traction drive may have different sizes, the maximum contact stress for each planetary roller is not necessarily the same. To improve fatigue life, it is desirable to select the planetary roller size and place these rollers in proper azimuth positions so that every planetary roller has approximately the same contact stress.

Figure 6:
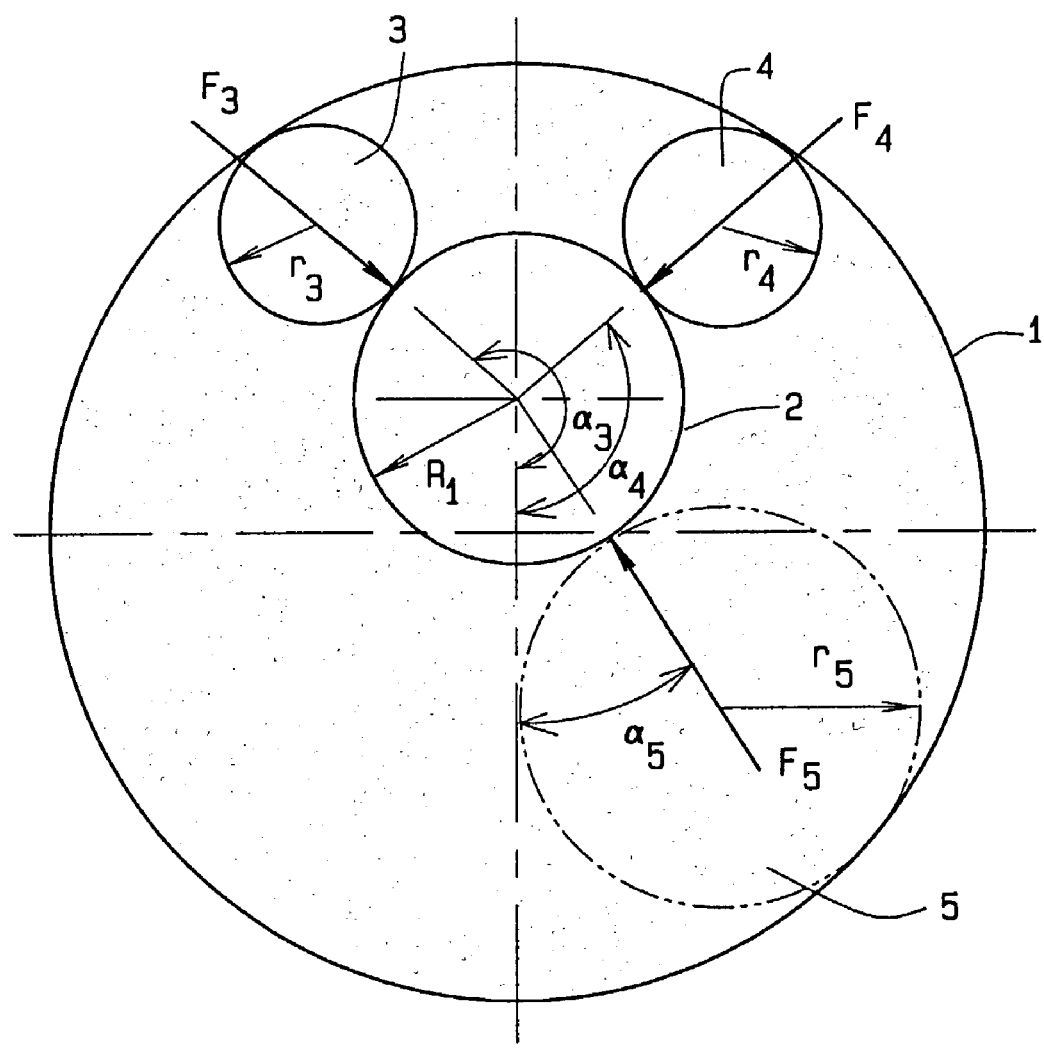
FIG. 6 is a graphical representation of the normal forces between the components of the present invention.

Assume under a specified load (usually the maximum weighted load), the effective radius of the flexible loading planetary roller 5 is $r_5$ (after being squeezed), and its azimuth position is $\alpha_5$ (see FIG. 6). The radii of the supporting planetary rollers 3 and 4 are determined from the following equations in conjunction with equation (3).

$$\overline{R}_3 \sin(\alpha_5-\alpha_3)+\overline{R}_4 \sin(\alpha_5-\alpha_4)=0 \tag{8}$$

$$\overline{R}_3 \cos(\alpha_5-\alpha_3)+\overline{R}_4 \cos(\alpha_5-\alpha_4)+\overline{R}_5=0 \tag{9}$$

where $$\overline{R}_i = \frac{R_1 \cdot r_i}{R_1 + r_i}$$

(i=3, 4, or 5) represents the composite contact radii for contact between the sun roller 2 and the planetary rollers 3, 4, and 5, respectively.

The geometry relationship between the radius and azimuth position of any supporting planetary roller is given by equation (3). That is:

$$r_i = \frac{R_2^2 - R_1^2 - e^2 + 2eR_1\cos\alpha_i}{2(R_2 + R_1 - e\cos\alpha_i)} \tag{3b}$$

Subscript i=3 and 4 refers to the supporting planetary rollers 3 and 4 respectively. To avoid edge stress, first cylindrical raceway 9 and second cylindrical raceway 12 are may be crowned. Or, alternatively, the third and fourth cylindrical raceways 16, 17, and 18 of the planetary rollers 3, 4, and 5 may be crowned.

The outer surface of the outer ring member 1 can have gear teeth to communicate motion of rotation to a driving or driven component. Alternatively, the outer surface of the outer ring member can be made into a pulley to communicate motion of rotation to a belt.

Figure 8:
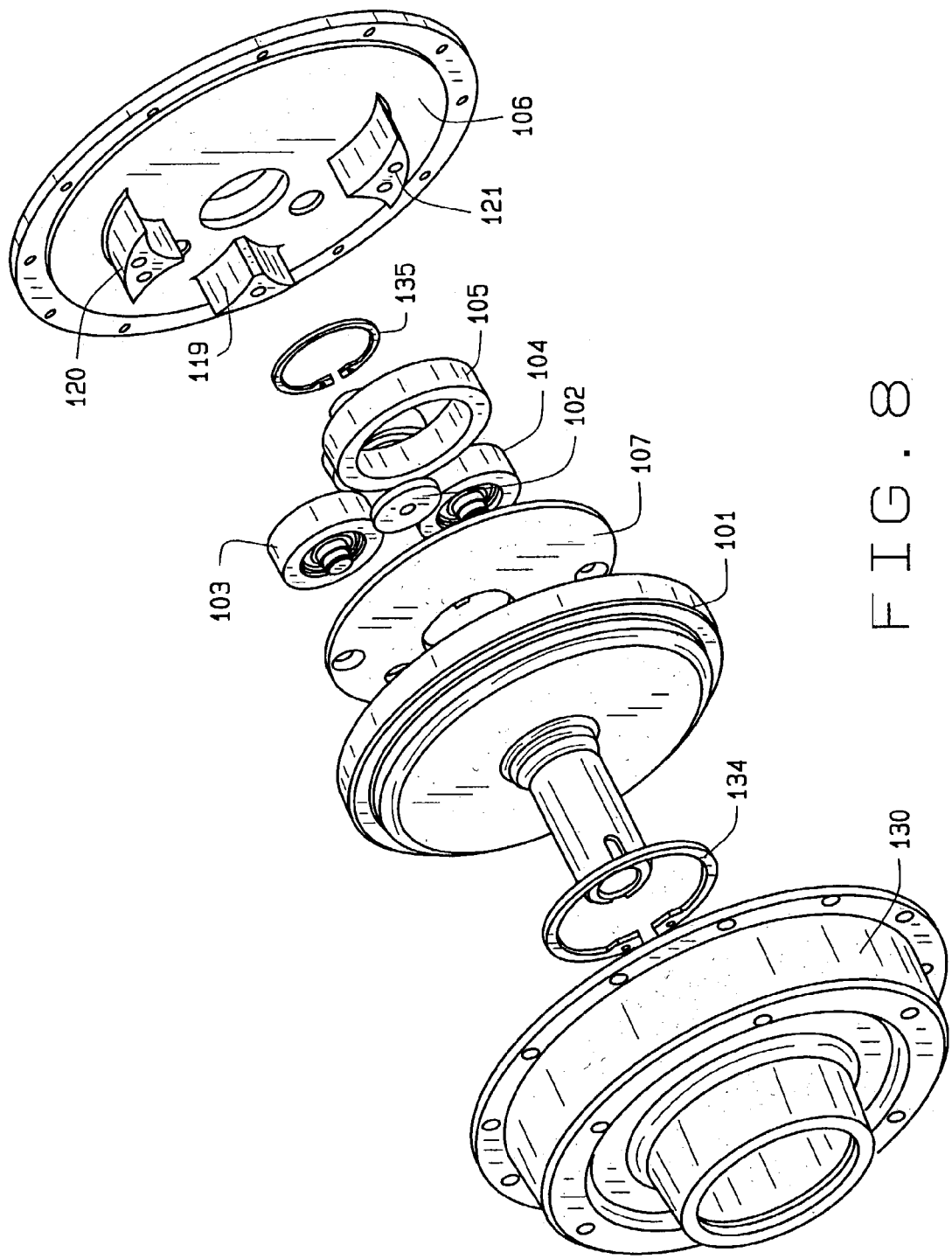
FIG. 8 is an exploded perspective view of a second embodiment of the present invention.

A second embodiment of the current invention is shown in FIG. 8. The second embodiment comprises an outer ring member 101, a sun roller member 102, two supporting planetary rollers 103 and 104, a flexible loading planetary roller 105, a carrier member 127, and a housing 130. The outer ring member 101 includes a first cylindrical raceway 109, and a shaft 133 supported on the housing 130 through a double row ball bearing 131. The sun roller member 102 has a second cylindrical raceway 112 and a shaft 115. The shaft 115 is supported on the carrier 127 by a ball bearing 132.

The second cylindrical raceway 112 on the sun roller member 102 is surrounded by and set eccentric to the first cylindrical raceway 109 in the outer ring member 101. The two supporting planetary rollers 103 and 104 are arranged in the wedge gap between the second cylindrical raceway 112 and the first cylindrical raceway 109. Each supporting planetary roller 103 and 104 has a shaft 122 that is fixed to the carrier member 127. The supporting rollers 103 and 104 are supported on the shaft 122 by bearings 126. The flexible loading roller 105 is arranged in the wedge gap between the two supporting rollers. The center of the flexible roller is free to rotate along the wedge gap.

The carrier member 127 includes a base plate 106 and a cover plate 107. The base plate 106 has three protrusions 119, 120, and 121. The cover plate 107 is bolted to the protrusions on the base plate 106. The carrier member 127 is mounted to the housing 130 by a fastening means such as bolts. Bearing 131 is axially located by a snap ring 134 and a shoulder 136 in the housing 130. Bearing 132 is axially fixed by a snap ring 135 and a shoulder 137 in the carrier member 127.

What I claim is:

1. A planetary traction drive transmission comprising:
  an outer ring member;
  a carrier member;
  a sun roller member eccentric to the outer ring member;
  at least one loading planetary roller located between the ring member and the sun member such that a convergent wedge gap exists between the ring member and the sun roller member at the side of the loading planetary roller; and
  at least one supporting planetary roller mounted on the carrier member and located between the ring member and the sun roller member;
  wherein one of either the at least one loading planetary roller or the at least one supporting planetary roller in comparison to any other planetary roller is more flexible in the radial direction such that it will deform diametrically when the loading planetary roller moves farther into the convergent wedge gap.

2. The planetary traction drive transmission of claim 1 wherein the outer ring member further comprises an axis of rotation and a first cylindrical raceway surrounding the axis of rotation.

3. The planetary traction drive transmission of claim 2 wherein the sun roller member further comprises a first shaft and a second cylindrical raceway, the second cylindrical raceway being eccentric to the first cylindrical raceway to form the convergent wedge between the said first and second cylindrical raceway.

4. The planetary traction drive transmission of claim 3 wherein the loading planetary roller includes a third cylindrical raceway and the at least one supporting planetary roller has a fourth cylindrical raceway.

5. The planetary traction drive transmission of claim 4 further comprising at least one support shaft for supporting the at least one supporting planetary roller in the carrier member.

6. The planetary traction drive transmission of claim 5 wherein
  the carrier member includes a base plate, a cover plate, and at least two fasteners,
  the base plate having at least two extrusions protruding from the back surface of the base plate,
  the at least two extrusions being sized and located on the base plate to form cavities for receiving the at least one loading planetary roller and the at least one supporting planetary roller, each of the at least two extrusions also having a threaded hole therein,
  the cover plate having a set of mounting holes located in the cover plate such that each of the set of mounting holes aligns with one of the threaded holes in the at least two extrusions, and
  wherein the base plate has a first set of support shaft openings and the cover plate has a second set of support shaft openings, both sets of support shaft openings being sized and located to accept the at least one support shaft for the at least one supporting planetary roller.

7. The planetary traction drive transmission of claim 6 wherein one supporting planetary roller is supported on its respective support shaft by a bearing, and further comprising a means for retaining the bearing onto the individual support shaft of the at least one supporting planetary roller.

8. The planetary traction drive transmission of claim 7 wherein the at least one loading planetary roller is assembled in the convergent wedge gap at an azimuth angle between $\alpha_1 = -90$ to 90 degrees and the center of the at least one loading planetary roller is free floating along the convergent wedge gap.

9. The planetary traction drive transmission of claim 8 wherein the supporting planetary roller is arranged in the convergent wedge gap generally at an azimuth angle between $\alpha_1 = 90$ to 270 degrees and the center of the at least one supporting planetary roller is fixed in relation to the carrier member.

10. The planetary traction drive transmission of claim 9 wherein the wedge angle $\delta$ for the at least one loading planetary roller at azimuth position $\alpha_1$ is characterized by $$\delta = \text{Arccos}\left[\frac{(R_1 + r)^2 + (R_2 - r)^2 - e^2}{2(R_1 + r)(R_2 - r)}\right]$$

where:
  $R_1$ is the radius of the second cylindrical raceway of the sun roller member;
  $R_2$ is the radius of the first cylindrical raceway of the outer ring member;
  e represents the eccentricity between the first cylindrical raceway and the second cylindrical raceway; and
  r is the effective radius of the at least one loading planetary roller at this azimuth position and is expressed in terms of $\alpha_1$ as:

$$r = \frac{R_2^2 - R_1^2 - e^2 + 2eR_1\cos\alpha_1}{2(R_2 + R_1 - e\cos\alpha_1)}.$$

11. The planetary traction drive transmission of claim 10 wherein a geometry coefficient $\mu_G$ is set to vary with the contact load through change in the wedge angle $\delta$ to provide an adaptive loading mechanism and the geometry coefficient $\mu_G$ is characterized by $$\mu_G = \tan\left(\frac{\delta}{2}\right).$$

12. The planetary traction drive transmission of claim 11 wherein the variations in the geometry coefficient $\mu_G$ is induced mainly by a diametrical reduction of the at least one loading planetary roller as the at least one loading planetary roller is squeezed within the convergent wedge gap where the diametrical reduction is characterized by $$2dr = \left(\frac{\pi}{4} - \frac{2}{\pi}\right)\frac{Wr^3}{EI}$$

where:

W is the contact load;

E is the Young's elastic modulus; and

I is the area moment of inertia of ring cross section for the at least one loading planetary roller.

13. The planetary traction drive transmission of claim 12 wherein the geometry coefficient $\mu_G$ is set to closely match the change in a maximum available traction coefficient $\mu_T$ the load changes and the geometry coefficient $\mu_G$ corresponding to the diametrical reduction of the at least one loading planetary roller is characterized by $$\mu_G = \tan\left\{\frac{1}{2}\text{Arc}\cos\left[\frac{(R_1+R_2+e-2dr)^2+(R_1+R_2-e+2dr)^2-4e^2}{2(R_1+R_2+e-2dr)(R_1+R_2-e+2dr)}\right]\right\}.$$

14. The planetary traction drive transmission of claim 13 wherein the maximum geometry coefficient $\mu_{Gmax}$ is set to be no greater than the maximum possible traction coefficient $\mu_T$ and the maximum geometry coefficient $\mu_{Gmax}$ is characterized by $$\mu_{G\max} = \tan\left\{\frac{1}{2}\text{Arc}\cos\left[1-2\left(\frac{e}{R_1+R_2}\right)^2\right]\right\}.$$

15. The planetary traction drive transmission of claim 14 wherein radii for the at least one supporting planetary roller is characterized by $$\overline{R}_3 \sin(\alpha_5-\alpha_3)+\overline{R}_4\sin(\alpha_5-\alpha_4)=0$$

$$\overline{R}_3 \cos(\alpha_5-\alpha_3)+\overline{R}_4\cos(\alpha_5-\alpha_4)+\overline{R}_5=0$$

where:

$\alpha_5$=the azimuth position of the at least one loading planetary roller;

$\alpha_3$=the azimuth position of one of the at least one supporting planetary roller;

$\alpha_4$=the azimuth position of the other of the at least one supporting planetary roller;

$$\overline{R}_3 = \frac{R_1 \cdot r_3}{R_1+r_3}$$

where $R_1$ is the radius of the second cylindrical raceway of the sun roller member and $r_3$ is radius of one of the at least one supporting planetary roller;

$$\overline{R}_4 = \frac{R_1 \cdot r_4}{R_1+r_4}$$

where $R_1$ is the radius of the second cylindrical raceway of the sun roller member and $r_4$ is the radius of the other at least one supporting planetary roller;

$$\overline{R}_5 = \frac{R_1 \cdot r_5}{R_1+r_5}$$

where $R_1$ is the radius of the second cylindrical raceway of the sun roller member cylindrical raceway and $r_5$ is the radius of the at least one planetary roller.

16. The planetary traction drive transmission of claim 15 wherein the geometric relationship between the radius and azimuth position of each of the at least one supporting planetary roller is characterized by $$r_i = \frac{R_2^2-R_1^2-e^2+2eR_1\cos\alpha_i}{2(R_2+R_1-e\cos\alpha_i)}$$

Where:

$\alpha_i$=the azimuth position of the at least one planetary roller $r_i$=the radius of one of the at least one planetary roller.

17. The planetary traction drive transmission of claim 16 wherein the moment of inertia of the material from which the at least one loading planetary roller is made allows the loading planetary roller to deform such that the change in the geometry coefficient either matches or nearly matches the change of maximum available traction coefficient due to changes in the contact load between the at least one loading planetary roller and the outer ring member, and between the at least one loading planetary roller and the sun roller member.

18. The planetary traction drive transmission of claim 17 wherein the first cylindrical raceway and the second cylindrical raceway are slightly crowned.

19. The planetary traction drive transmission of claim 17 wherein the third cylindrical raceway of the at least one loading planetary roller and at least one of the fourth raceways of the at least one supporting planetary roller is slightly crowned.

20. A planetary drive transmission comprising:

an outer ring;

a sun roller located eccentrically within the outer ring so that the axes of the sun roller and ring are offset;

a pair of planetary supporting rollers located between sun roller and the ring with their axes being offset from each other, a planetary loading roller located between the sun roller and the ring with its axis being offset from the axes of the planetary supporting rollers such that a convergent wedge gap exists between the sun roller and the ring at the side of the planetary loading roller, one of the planetary rollers being more flexible than the other planetary rollers such that it will deform diametrically when the planetary loading roller moves farther into the convergent wedge gap.

21. A planetary drive transmission according to claim 20 wherein the planetary loading roller is more flexible than the planetary supporting rollers.

22. A transmission according to claim 21 wherein the outer ring, the sun roller and the supporting rollers have substantially cylindrical raceways, with the supporting rollers along their raceways contacting the raceways of the outer ring and sun roller; and wherein the loading roller has a raceway that contacts the raceways on the outer ring and sun roller and is substantially cylindrical when not deformed.

23. A planetary drive transmission according to claim 21 and further comprising a carrier that establishes the axes about which the planetary supporting rollers revolve, with those axes being fixed with respect to each other.

* * * * *